(12) United States Patent
Matveev

(10) Patent No.: US 7,973,262 B2
(45) Date of Patent: Jul. 5, 2011

(54) POWERPLANT AND METHOD USING A TRIPLE HELICAL VORTEX REACTOR

(76) Inventor: Igor Matveev, McLean, VA (US)

( * ) Notice: Subject to any disclaimer, the term of this patent is extended or adjusted under 35 U.S.C. 154(b) by 1125 days.

(21) Appl. No.: 11/697,291

(22) Filed: Apr. 5, 2007

(65) Prior Publication Data

US 2008/0245749 A1  Oct. 9, 2008

(51) Int. Cl.
*B23K 10/00* (2006.01)

(52) U.S. Cl. ........... 219/121.5; 219/121.48; 219/121.59; 219/121.36; 422/186; 422/224

(58) Field of Classification Search ............. 219/121.36, 219/121.5, 121.51, 121.48, 121.54, 121.59; 422/186, 224; 110/246
See application file for complete search history.

(56) References Cited

U.S. PATENT DOCUMENTS

| | | | |
|---|---|---|---|
| 5,024,684 A | 6/1991 | Tank | |
| 5,413,227 A | 5/1995 | Diebold et al. | |
| 5,512,216 A * | 4/1996 | Rock et al. | 261/79.1 |
| 5,968,378 A * | 10/1999 | Jensen | 219/121.43 |
| 6,187,206 B1 | 2/2001 | Bernier et al. | |
| 6,380,268 B1 | 4/2002 | Yakobson et al. | |
| 6,606,855 B1 | 8/2003 | Kong | |
| 6,804,950 B2 | 10/2004 | Kong | |
| 6,853,142 B2 | 2/2005 | Chistyakov | |
| 6,924,608 B2 | 8/2005 | Czernichowski et al. | |
| 6,976,362 B2 | 12/2005 | Sheppard et al. | |
| 2006/0135630 A1 | 6/2006 | Bowe | |
| 2011/0076630 A1* | 3/2011 | Jameel | 431/181 |

* cited by examiner

*Primary Examiner* — Mark H Paschall
(74) *Attorney, Agent, or Firm* — Louis Ventre, Jr.

(57) ABSTRACT

A powerplant and method for production and use of synthesis gas from a hydrocarbon fuel is disclosed in a combination of a triple helical flow vortex reactor (100) and a power producer (510). The triple helical flow vortex reactor (100) steam-reforms a hydrocarbon fuel in a rich combustion environment and produces a gas stream with synthesis gas. The triple helical flow vortex reactor (100) has a plasma torch to introduce a central vortex and two swirlers to introduce counterposing vortexes, or circumferential flows, at the periphery of a reaction chamber in the triple helical flow vortex reactor. The synthesis gas fuels the power producer (510).

15 Claims, 3 Drawing Sheets

# POWERPLANT AND METHOD USING A TRIPLE HELICAL VORTEX REACTOR

FIELD OF INVENTION

In the field of power production, a powerplant and methods of using the powerplant employing a triple helical flow vortex reactor.

DESCRIPTION OF PRIOR ART

This invention discloses an innovative powerplant utilizing in part a triple helical flow vortex reactor. The Triple Helical Flow Vortex Reactor is the subject of a pending U.S. patent application Ser. No. 11/309,644 filed Sep. 2, 2006 by the same applicant, which is hereby incorporated by reference herein.

The steam reforming process is well known in the prior art as are devices employed to utilize the gases produced through steam reforming of hydrocarbon fuels. The novelty and innovation in any such device or process, as with the current invention, lies in improving efficiencies and expanding the scope and flexibility of hydrocarbon fuels that can be utilized in the process. Additionally, the present invention expands the potential utilization of steam reforming in a powerplant by adding the potential of using a variety of carbon fuels with minimal or no hydrogen component. For example, carbon fuels may be obtained as a by-product of automotive tire recycling. The present invention, thus, enlarges the options for the fuel used in a powerplant and the type of power produced by a unique combination of components operated in the integrated process.

An example of plasma steam reforming is U.S. Pat. No. 6,804,950 disclosing plasma reforming and partial oxidation of hydrocarbon fuel vapor to produce synthesis gas and/or hydrogen gas. Methods and systems are disclosed for treating vapors from fuels such as gasoline or diesel fuel in an internal combustion engine, to form hydrogen gas or synthesis gas, which can then be burned in the engine to produce more power.

While similar products result from the present invention, fuel flexibility and details of the devices and processes used are unique. The present invention utilizes a specific reactor, namely the triple helical flow vortex reactor. This reactor in this invention includes an innovative component, namely, one or more multi-function plasma torches, that improve reforming and overall efficiencies and dramatically expand the scope and flexibility of potential fuels that can be utilized. For example, the preferred variety of fuels includes carbon fuels of all types, such as plastic refuse, and hydrocarbon fuel such as natural gas, oil, gasoline, diesel fuel, biomass, and coal. The preferred combinations of components in the present invention also enlarge the options for the type of power production, such as a reaction gas for a rocket, motive power for a vehicle, electrical power or heat.

Accordingly, the present invention will serve to improve the prior art by increasing powerplant efficiencies, expanding the scope and flexibility of hydrocarbon fuel that can be utilized to produce power, enlarging the options for the type of power production achievable, and employing unique elements used in an integrated process.

BRIEF SUMMARY OF THE INVENTION

A powerplant and method for production and use of synthesis gas from a carbon or hydrocarbon fuel is disclosed in a combination of a triple helical flow vortex reactor and a power producer. The triple helical flow vortex reactor steam reforms a carbon or hydrocarbon fuel in a rich combustion environment and produces a gas stream with synthesis gas. The triple helical flow vortex reactor has a plasma torch to introduce a central vortex and two swirlers to introduce counterposing vortexes, or circumferential flows, at the periphery of a reaction chamber in the triple helical flow vortex reactor. The synthesis gas fuels the power producer.

BRIEF DESCRIPTION OF THE DRAWINGS

Referring now to the drawings in which like reference numbers represent corresponding parts throughout.

DETAILED DESCRIPTION

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural and operational changes may be made without departing from the scope of the present invention.

Figure 1:
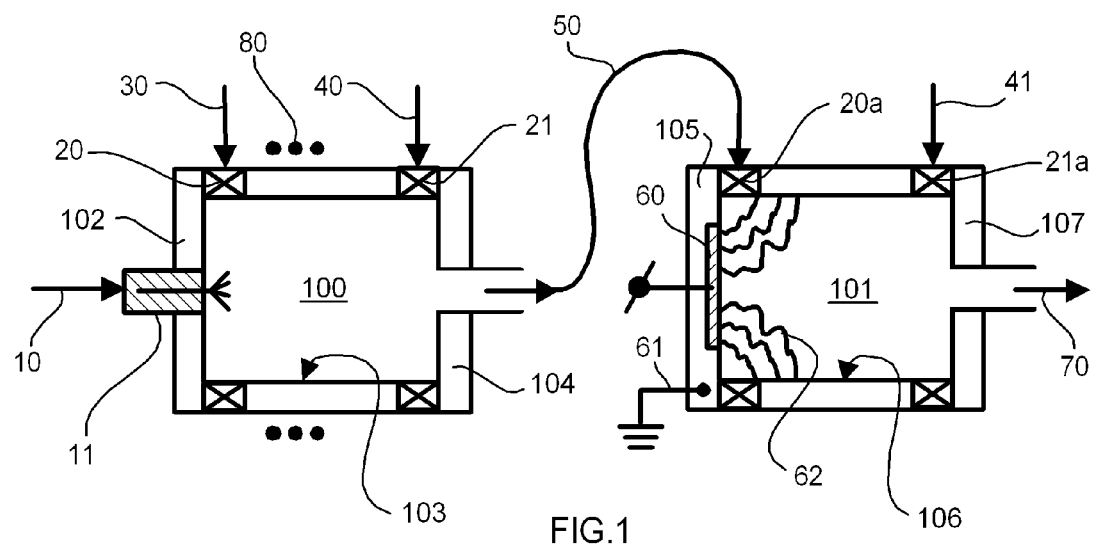
FIG. 1 is a schematic of a dual plasma reactor embodiment with a central feed in the reactor.

FIG. 1 shows a schematic of a preferred embodiment of the invention for the production and use of synthesis gas from a carbon or hydrocarbon fuel in a powerplant. A triple helical flow vortex reactor (100) and a power producer in the form of a double helical flow vortex reactor (101) are combined into an operating unit.

Reference herein to fuel is intended to refer to a carbon or hydrocarbon fuel.

The triple helical flow vortex reactor (100) produces a gas stream rich in synthesis gas (50) by steam reforming a fuel. A first fluid (10), which is selected from a group consisting of fuel, steam, oxygen, and air, is fed into the reactor (100). The first fluid (10) may be a liquid, gas, gas and solid particle mixture, liquid and solid particle slurry, or liquid, gas and solid particle mixture. For example, in the case of coal reformation, the preferred first fluid (10) is pulverized coal that is fed in as a pulverized suspension in air and steam, or as a coal and liquid water slurry with air and steam. The reactor (100) has a reaction chamber defined by a fuel inlet end (102), a gas stream outlet end (104) at opposing axial ends of the reaction chamber, and an inner wall (103).

The triple helical flow vortex reactor first comprises a plasma torch (11) used as the means to introduce into the reaction chamber at the fuel inlet end (102) a central vortex flow of first fluid (10) and initiate combustion of the first fluid (10). The first fluid (10) is typically any combination of air, steam, air and steam, air and fuel, steam and fuel, or air and fuel slurry. Other gases known in the art to produce inductively coupled plasmas, such as noble gases argon and helium, may also be used in the first fluid (10). The plasma torch (11) is further capable of heating and ionizing the first fluid prior to introduction into the reaction chamber in order to initiate an inductively coupled plasma discharge within the reaction chamber. Such preheating is typically performed by partially burning the first fluid (10) in the plasma torch.

For applications using coal fuel, several small plasma torches are preferable. The plasma torch feeds the first fluid (10) into the reaction chamber preferably tangential to the reformer axis. The plasma torch functions as a plasma igniter, a pre-heater, an inductively coupled plasma initiator, and a fuel feeder.

The triple helical flow vortex reactor (100) next comprises a first circumferential flow apparatus (21), also known as a swirler, at the gas stream outlet end (104). The first circumferential flow apparatus (21) has a fluid connection for creating a circumferential fluid flow second vortex at the periphery of the reaction chamber that spirals away from said apparatus towards the fuel inlet end (102). The fluid connection is capable of being used with a second fluid (40) selected from a group consisting of steam, oxygen, and air.

The triple helical flow vortex reactor (100) next comprises a second circumferential flow apparatus (20) at the fuel inlet end (102). This apparatus (20) has a fluid connection for creating a circumferential fluid flow third vortex at the periphery of the reaction chamber such that said vortex spirals towards the gas stream outlet end (104) and creates a mixing region adjacent to the fuel inlet end. This fluid connection is capable of being used with a third fluid (30) selected from a group consisting of ionized media, steam, and fuel. The preferred ionized media is ionized air and other well known ionized media are ionized noble gases such as argon and helium.

Figure 5:
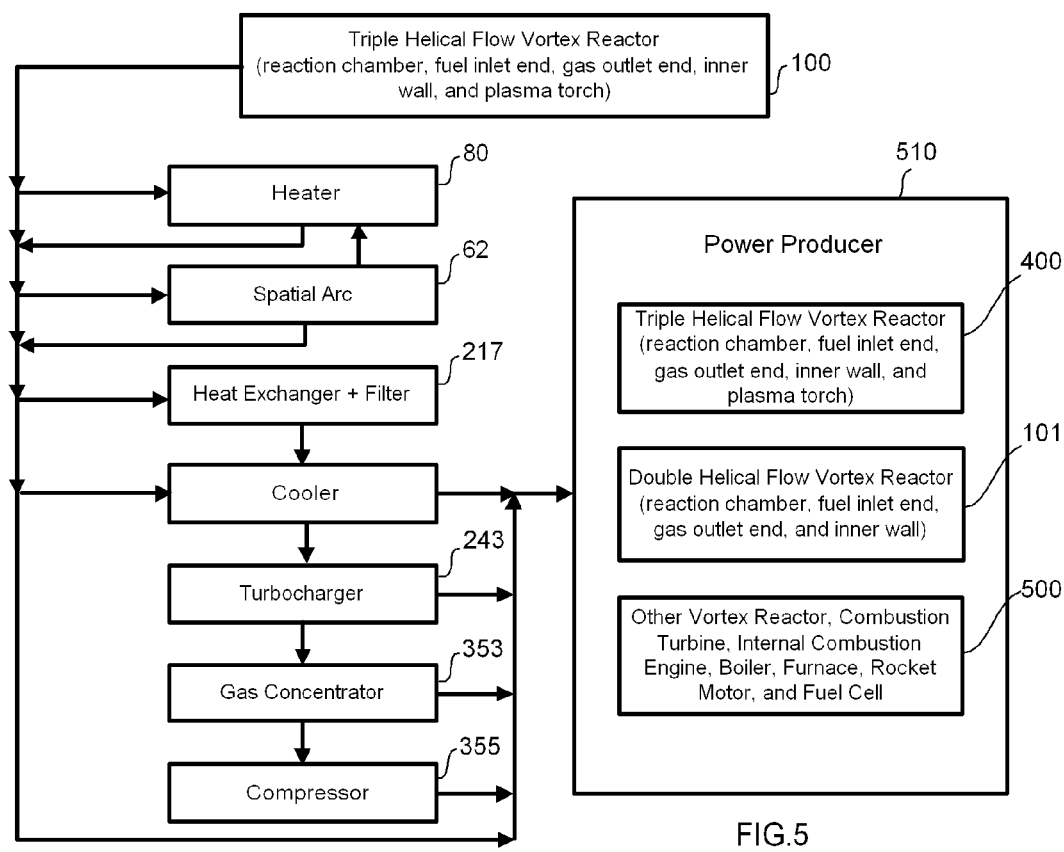
FIG. 5 is a flow diagram of various preferred embodiments of the invention.

The power producer (510) as shown in FIG. 5 is operably connected to be fueled by the gas stream rich in synthesis gas (50) produced from the triple helical flow vortex reactor. The power producer (510) in various alternative embodiments may be any device capable of using the synthesis gas to produce power, the most commonly known are shown in FIG. 5 as a triple helical flow vortex reactor (400), a double helical flow vortex reactor (101), or any other helical flow vortex reactor, combustion turbine, internal combustion engine, boiler, furnace, rocket motor, and fuel cell (500).

The power producer (510) shown in FIG. 1 is a double helical flow vortex reactor (101). This reactor (101) has a reaction chamber defined by a fuel inlet end (105), an exhaust gas outlet end (107) at opposing axial ends of the reaction chamber, and an inner wall (106) that is electrically connected to ground (61) to form an anode.

The reactor (101) has an outward circumferential flow apparatus (20a) at the fuel inlet end (105). This apparatus (20a) has a fluid connection for creating a circumferential fluid flow outward vortex at the periphery, that is a vortex adjacent to the inner wall (106) of the reaction chamber. The outward vortex spirals towards the exhaust gas outlet end (107) and creates a mixing region adjacent to the fuel inlet end (105). The fluid connection is capable of being used with the gas stream rich in synthesis gas (50) from the triple helical flow vortex reactor.

This reactor (101) has an inward circumferential flow apparatus (21a) at the exhaust gas outlet end (107). This apparatus (21a) has a fluid connection for creating a circumferential fluid flow second vortex at the periphery, that is a vortex adjacent to the inner wall (106) of the reaction chamber such that said second vortex spirals away from said apparatus (21a) towards the fuel inlet end (105). This fluid connection is capable of being used with an oxidizer selected from a group consisting of air and oxygen.

This reactor (101) has a charged cathode (60) that is electrically insulated from and affixed to the reaction chamber at the fuel inlet end (105). The charged cathode (60) is capable of initiating a traveling spatial arc (62) between the cathode (60) and the anode in a circumferential gap that spans the fluid connection from the outward circumferential flow apparatus (20a). The traveling spatial arc (62) is so termed because it travels or expands away from the circumferential gap enabled by the fluid flow from the outward circumferential flow apparatus (20a). In operation, this traveling spatial arc (62) efficiently ignites the synthesis gas and oxidizer mixture and produces a high temperature and pressure exhaust (70) that may be used, for example, to power a rocket.

Figure 4:
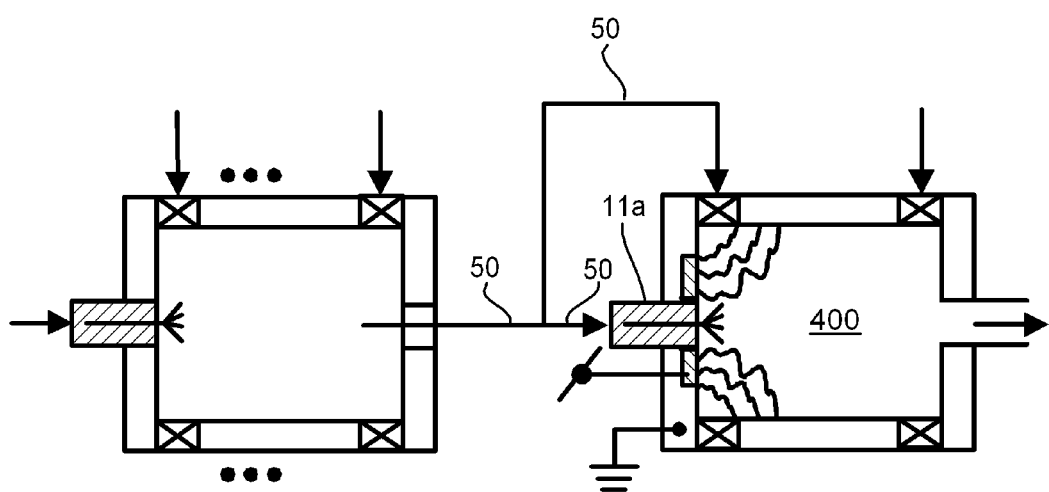
FIG. 4 is a schematic of a dual plasma reactor embodiment with a central feed in the both plasma reactors.

An alternative embodiment shown in FIG. 4 adds a means to introduce a central vortex flow of the gas stream rich in synthesis gas to the reactor, making it a triple helical flow vortex reactor (400). For most such embodiments, this means is a plasma torch (11a) having the means to introduce such central vortex flow.

Figure 2:
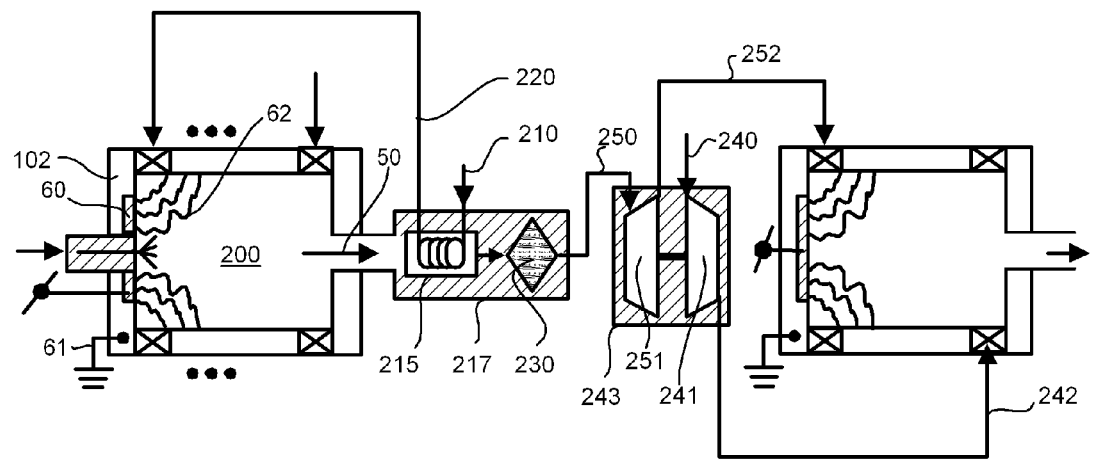
FIG. 2 is a schematic of a dual plasma reactor embodiment with a heat exchanger, filter, and turbocharger.

In an alternative embodiment shown in FIG. 2, the fluid connection of the second circumferential flow apparatus (20) is also capable of receiving steam (220) from the heat exchanger (215).

This alternative embodiment shown in FIG. 2 is primarily for difficult to combust hydrocarbon fuels like coal. For this alternative embodiment, the steam (220) is generated by a heat exchanger (215) cooling the gas stream rich in synthesis gas (50) exiting the triple helical flow vortex reactor, and heating water (210) to steam (220). This heat exchanger (215) is flowably connected to the gas stream outlet end (104) and is preferably a closed loop heat exchanger. The steam side of the heat exchanger is flowably connected to the second circumferential flow apparatus (20) at the fuel inlet end (102) of the triple helical flow vortex reactor (100).

This alternative embodiment shown in FIG. 2 also employs a filter (230) to clean the gas by removing particulate matter from the gas stream rich in synthesis gas (50) and producing a cleaned gas (250). The cleaned gas (250) powers a turbocharger (243) that takes in air (240) and produces compressed air (242) for the power producer (510). The cleaned gas (250) is expanded in the turbocharger to compress the air (240). The cleaned gas (250) leaves the turbocharger (243) as a lower-pressure gas stream (252).

This alternative embodiment shown in FIG. 2 employs a heater (80) shown in FIG. 1 operably attached to heat fluids in the reaction chamber of the triple helical flow vortex reactor. This embodiment would typically be used when additional heating may be needed to start or aid the steam reforming process with fuels such as coal. Any style heater may be used such as for example, an inductive heater, a laser heater and a microwave heater. The preferred heater (80) as shown in FIG. 1, is an inductive heater configured as a coil surrounding the reaction chamber and having a frequency between 440 kHz to 20 MHz wave band.

An alternative embodiment shown in FIG. 2 adds a charged cathode (60) to the triple helical flow vortex reactor (200). In this embodiment, the reactor (200) is electrically connected to ground (61) to form an anode. The charged cathode (60) is electrically insulated from and affixed in the reaction chamber at the fuel inlet end (102). The charged cathode (60) must be capable of being electrically charged to a sufficient level to initiate an arc between the charged cathode (60) and the anode in a circumferential gap that spans the fluid connection from the outward circumferential flow apparatus (20). By spanning the fluid connection, the force of fluid flow out of the outward circumferential flow apparatus (20) pushes on the arc and enables the traveling spatial arc (62).

Figure 3:
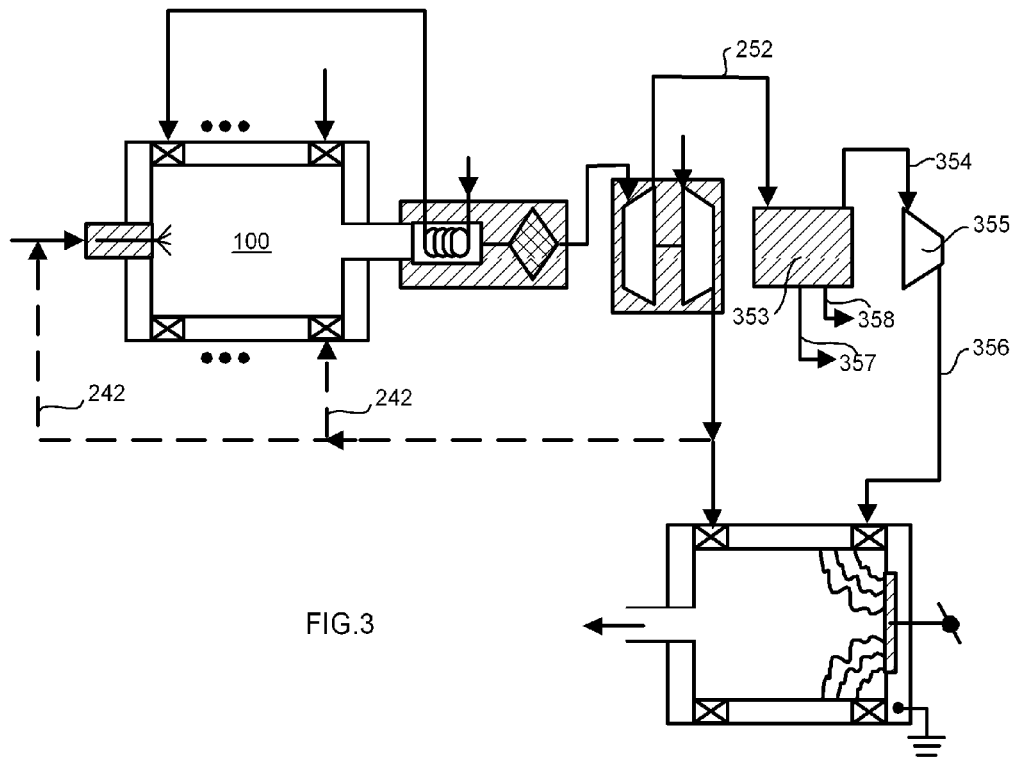
FIG. 3 is a schematic of a dual plasma reactor embodiment with a heat exchanger, filter, turbocharger, and gas concentrator.

An alternative embodiment included in FIGS. 3 and 5 adds a means for concentrating (353) one or more of the gases in the cleaned gas, producing a concentrated gas (354). Concentrating gases typically means removing nitrogen (358) and hydrogen sulfide (357) but may also include removal of carbon dioxide, carbon monoxide, water in the form of steam, and other gas contaminants. Such means are well known gas removal and separation technologies, including for example, pressure swing adsorption, cryo-separation, membrane scrubber, liquid redox processes, scavengers, dry catalytic processes and others.

An alternative embodiment included in FIGS. 3 and 5 adds a compressor (355) to increase the pressure of the concentrated gas prior to injection in the power producer (510).

An alternative embodiment included in FIG. 5 adds a cooler. Some power producers may require reducing the temperature for the gas stream rich in synthesis gas (50). For example, an internal combustion engine would typically require a gas stream temperature not greater than about 50 degrees Centigrade when fed to the engine through nozzles. The cooler, typically a heat exchanger using once through water to cool the gas, would be used to cool the gas stream rich in synthesis gas (50) to the optimal feed temperature.

The methods of the invention use the powerplant in its various embodiments as represented in FIG. 5.

The invention is basically an alternative to direct combustion of a fuel to produce power.

In its basic embodiment, the powerplant uses a double stage process. The first stage, using the triple helical flow vortex reactor (100), is a well-known process of steam reformation of carbon or hydrocarbons. Use of this reactor permits highly efficient steam reformation of the fuel that produces a gas stream rich in synthesis gas. Synthesis gas is primarily composed of hydrogen and carbon monoxide.

The second stage, using the power producer (510), with a lean mixture of oxidizer and a gas stream rich in synthesis gas (50) burns the mixture, or utilizes the mixture in the case of fuel cells, to produce power. For the preferred embodiment as shown in FIG. 1, the power producer (510) is a double helical flow vortex reactor that creates a high temperature and pressure exhaust that may be used directly for rocket propulsion or indirectly used to power another device.

The preferred method of using the powerplant in this basic embodiment comprises 6 steps, each as described in the following paragraphs.

The first is a step of injecting the first fluid into the reaction chamber of the triple helical flow vortex reactor (100) through the plasma torch (111) such that oxygen represents less than a stoichiometric amount needed for fully combusting the hydrocarbon fuel. As is customary in steam reformation, this stage would usually employ a very rich mixture of hydrocarbon fuel and air with a typical air/fuel ratio of about 0.2-0.3, wherein the stoichiometric ratio is 1. This ratio is sufficient for later combustion to provide the endothermic heat of reaction needed to chemically react the carbon and hydrogen in the hydrocarbon fuel with hydrogen and oxygen of the water to create a gas stream that is rich in synthesis gas, that is, rich in carbon monoxide and hydrogen.

The second step is a step of injecting the second fluid (40) through the first circumferential flow apparatus. As noted above, the second fluid (40) is essentially the oxidizer and may include steam. The second fluid is selected from a group consisting of steam, oxygen, and air. This injection step sends the second fluid in a helical spiral towards the fuel inlet end (102).

The third step is a step of injecting the third fluid through the second circumferential flow apparatus. As noted above, the third fluid (30) is selected from a group consisting of ionized media, steam, and fuel. The injection of this third fluid (30) through the second circumferential flow apparatus (20) at the fuel inlet end (102) adds additional fuel and steam to promote mixing in the reaction chamber. Such injection also adds ionized media aids in the formation of inductively coupled plasma discharges within the reaction chamber, which, in turn, aids combustion. When the reaction chamber is equipped with a cathode (60) and anode, the injected ionized media also aids in the formation of a traveling spatial arc (62) as shown in FIG. 2.

The fourth step is a step of igniting the fluids in the reaction chamber with the plasma torch. The plasma torch (11) controls the process because it is a source of fuel and the ignition source in the preferred embodiment. The plasma torch simultaneously provides hydrocarbon fuel, adds heat to the first fluid (10), ignites the fluids in the reaction chamber and controls an ignition flame. When the hydrocarbon fuel is coal, multiple plasma torches may be used to provide the greater endothermic heat of reaction needed to reform coal.

The fifth step is a step of sending the gas stream rich in synthesis gas (50) to the power producer (510), which is a double helical flow vortex reactor (101) in this embodiment. For this embodiment, the gas stream rich in synthesis gas (50) is preferably piped to the second circumferential flow apparatus (20a). In alternative embodiments as shown in FIG. 4, the gas stream rich in synthesis gas is also piped to a plasma torch when the power producer (510) is a triple helical flow vortex reactor (400). In yet other alternative embodiments, the gas stream rich in synthesis gas is sent to any helical flow vortex reactor, combustion turbine, internal combustion engine, boiler, furnace, rocket motor, fuel cell or other power producer incident to its operation to produce power.

The sixth step is a step of operating the power producer to produce power. The operating steps of the power producer vary wherein by the type of power producer utilized, except that each such power producer must be able to utilize the gas stream rich in synthesis gas (50) in producing power. Therefore, the final sixth step in the method of the preferred embodiment of the invention provides for selecting the steps for operating the power producer from a group consisting of: (i) injecting an oxidizer into the power producer; and, combusting the gas stream rich in synthesis gas (50) in the power producer (510) to produce power; and, (ii) electrochemically converting the gas stream rich in synthesis gas (50) in a fuel cell. Other steps for other power producers will be obvious to those skilled in the art.

For the preferred embodiment using a double helical flow vortex reactor (101) as the power producer, operating the power producer includes injecting the oxidizer through the inward circumferential flow apparatus. The oxidizer is preferably in a quantity greater than the stoichiometric quantity to fully combust the gas stream rich in synthesis gas (50). It further includes a step of initiating a traveling spatial arc (62) between the cathode and the anode to combust the gas stream rich in synthesis gas (50) to produce power. The traveling spatial arc (62) is preferably a low power spatial arc that produces a low emission in a lean environment.

Power production may be in the form of a high temperature and pressure exhaust (70) that may be used, for example, to power a rocket. Other embodiments using a combustion turbine may produce power in the form of electrical power. Other embodiments using a boiler may produce power in the form of steam. Other embodiments using a fuel cell may produce power also in the form of electrical power.

The disclosure herein is to be considered as an exemplification of the principles of the invention and is not intended to limit the broad aspect of the invention to the embodiments illustrated. Thus, the scope of the invention is determined by the appended claims and their legal equivalents rather than by the examples given.

What is claimed is:

1. A powerplant for production and use of synthesis gas from a carbon or hydrocarbon fuel comprising:
   (a) a triple helical flow vortex reactor that produces a gas stream rich in synthesis gas by steam reforming a fuel, said reactor having a reaction chamber defined by a fuel inlet end, a gas stream outlet end at opposing axial ends of the reaction chamber, and an inner wall, wherein said triple helical flow vortex reactor comprises:
      (i) a plasma torch providing the means to introduce into the reaction chamber at the fuel inlet end a central vortex flow of first fluid and initiate combustion of the first fluid, said first fluid being selected from a group consisting of air and steam, air and fuel, steam and fuel, and air and fuel slurry, said plasma torch being further capable of heating and ionizing the first fluid prior to introduction into said reaction chamber.
      (ii) a first circumferential flow apparatus at the gas stream outlet end having a fluid connection for creating a circumferential fluid flow second vortex at the periphery of the reaction chamber such that said second vortex spirals away from said apparatus towards the fuel inlet end and wherein said second fluid connection is capable of being used with a second fluid selected from a group consisting of air, oxygen and steam; and,
      (iii) a second circumferential flow apparatus at the fuel inlet end of the triple helical flow vortex reactor having a fluid connection for creating a circumferential fluid flow third vortex at the periphery of the reaction chamber such that said vortex spirals towards the gas stream outlet end and creates a mixing region adjacent to the fuel inlet end, wherein said fluid connection is capable of being used with a third fluid selected from a group consisting of ionized media, steam, and fuel; and,
   (b) a power producer operably connected to be fueled by synthesis gas produced from the triple helical flow vortex reactor, said power producer selected from a group consisting of a helical flow vortex reactor, a combustion turbine, an internal combustion engine, a boiler, a furnace, a rocket motor, and a fuel cell.

2. The powerplant of claim 1 further comprising a heater operably attached to heat fluids in the reaction chamber of the triple helical flow vortex reactor and wherein the plasma torch further injects ionized media to initiate an inductively coupled plasma discharge within the reaction chamber.

3. The powerplant of claim 2 wherein the heater is selected from a group consisting of an inductive heater, a laser heater and a microwave heater.

4. The powerplant of claim 1 wherein the triple helical flow vortex reactor is electrically connected to ground to form an anode and further comprises a charged cathode that is electrically insulated from and affixed in the reaction chamber at the fuel inlet end, said cathode being capable of initiating an arc between the cathode and the anode in a circumferential gap that spans the fluid connection from the outward circumferential flow apparatus, and enabling the arc to expand away from the circumferential gap.

5. The powerplant of claim 1 further comprising:
   (a) a heat exchanger flowably connected to the gas stream outlet end capable of extracting heat from the gas stream rich in synthesis gas and producing steam, said steam being flowably connected to the second circumferential flow apparatus at the fuel inlet end of the triple helical flow vortex reactor; and,
   (b) a filter to remove particulate matter from said gas stream rich in synthesis gas exiting the triple helical flow vortex reactor to produce a cleaned gas.

6. The powerplant of claim 5 further comprising a cooler to reduce the temperature of the gas stream rich in synthesis gas.

7. The powerplant of claim 5 further comprising a turbocharger to compress air for injection into the power producer, said turbocharger aided by expansion of the cleaned gas.

8. The powerplant of claim 7 further comprising a means for concentrating one or more of the gases in the cleaned gas to produce a concentrated gas.

9. The powerplant of claim 8 further comprising a compressor to increase the pressure of the concentrated gas prior to injection in the power producer.

10. The powerplant of claim 1 wherein the power producer is a helical flow vortex reactor that produces a high temperature and pressure exhaust, said reactor having a reaction chamber electrically connected to ground to form an anode and being defined by a fuel inlet end, an exhaust gas outlet end at opposing axial ends of the reaction chamber, and an inner wall, wherein said helical flow vortex reactor comprises:
    (a) an inward circumferential flow apparatus at the exhaust gas outlet end having a fluid connection for creating a circumferential fluid flow second vortex at the periphery of the reaction chamber of the double helical flow vortex reactor such that said second vortex spirals away from said apparatus towards the fuel inlet end and wherein said fluid connection is capable of being used with an oxidizer selected from a group consisting of air and oxygen;
    (b) an outward circumferential flow apparatus at the fuel inlet end having a fluid connection for creating a circumferential fluid flow outward vortex at the periphery of the reaction chamber of the double helical flow vortex reactor such that said outward vortex spirals towards the exhaust gas outlet end and creates a mixing region adjacent to the fuel inlet end, wherein said fluid connection is capable of being used with synthesis gas in the gas stream from the triple helical flow vortex reactor; and,
    (c) a charged cathode that is electrically insulated from and affixed to the reaction chamber of the helical flow vortex reactor at the fuel inlet end, said cathode being capable of initiating an arc between the cathode and the anode in a circumferential gap that spans the fluid connection from the outward circumferential flow apparatus, and enabling the arc to expand away from the circumferential gap.

11. The powerplant of claim 10 wherein said helical flow vortex reactor further comprises a means to introduce a central vortex flow of the gas stream rich in synthesis gas.

12. A method of using the powerplant of claim 1 comprising the steps of:
    (a) injecting the first fluid into the reaction chamber of the triple helical flow vortex reactor through the plasma torch such that oxygen represents less than a stoichiometric amount needed for fully combusting the hydrocarbon fuel;
    (b) injecting the second fluid through the first circumferential flow apparatus;
    (c) injecting the third fluid through the second circumferential flow apparatus;
    (d) igniting the fluids in the reaction chamber with the plasma torch;

(e) sending the gas stream rich in synthesis gas to the power producer; and,
operating the power producer to produce power by consuming the gas stream rich in synthesis gas, wherein the steps for operating the power producer are selected from a group consisting of:
  (i) injecting an oxidizer into the power producer; and, combusting the gas stream rich in synthesis gas in the power producer to produce power; and,
  (ii) electrochemically converting the gas stream rich in synthesis gas in a fuel cell.

13. The method of claim 12 further comprising the step of heating of heating fluids in the reaction chamber of the triple helical flow vortex reactor.

14. The method of using the powerplant of claim 10 comprising the steps of:
(a) injecting the first fluid into the reaction chamber of the triple helical flow vortex reactor through the plasma torch such that oxygen represents less than a stoichiometric amount needed for fully combusting the hydrocarbon fuel;
(b) injecting the second fluid through the first circumferential flow apparatus;
(c) injecting the third fluid through the second circumferential flow apparatus;
(d) igniting the fluids in the reaction chamber with the plasma torch;
(e) sending the gas stream rich in synthesis gas to the outward circumferential flow apparatus of the double helical flow vortex reactor;
(f) injecting the oxidizer through the inward circumferential flow apparatus, said oxidizer being in a quantity greater than the stoichiometric quantity to fully combust the gas stream rich in synthesis gas; and,
(g) initiating a traveling spatial arc between the cathode and the anode to combust the gas stream rich in synthesis gas to produce power.

15. The method of claim 14 further comprising the step of heating of heating fluids in the reaction chamber of the triple helical flow vortex reactor.

* * * * *